(12) United States Patent
Schilder et al.

(10) Patent No.: US 10,049,100 B2
(45) Date of Patent: Aug. 14, 2018

(54) FINANCIAL EVENT AND RELATIONSHIP EXTRACTION

(75) Inventors: Frank Schilder, St. Paul, MN (US); James Shaw, Tenafly, NJ (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 1310 days.

(21) Appl. No.: 12/363,524

(22) Filed: Jan. 30, 2009

(65) Prior Publication Data
US 2009/0327115 A1   Dec. 31, 2009

Related U.S. Application Data

(60) Provisional application No. 61/063,047, filed on Jan. 30, 2008.

(51) Int. Cl.
| | |
|---|---|
| *H04N 1/40* | (2006.01) |
| *H04N 1/387* | (2006.01) |
| *G06Q 40/00* | (2012.01) |
| *G06F 17/27* | (2006.01) |
| *G06Q 40/02* | (2012.01) |

(52) U.S. Cl.
CPC ........... *G06F 17/278* (2013.01); *G06Q 40/00* (2013.01); *G06Q 40/02* (2013.01)

(58) Field of Classification Search
USPC ........................................ 358/462, 448, 453
See application file for complete search history.

(56) References Cited

U.S. PATENT DOCUMENTS

| | | | |
|---|---|---|---|
| 5,287,278 A | 2/1994 | Rau | |
| 5,819,265 A | 10/1998 | Ravin | |
| 6,336,094 B1 * | 1/2002 | Ferguson et al. | 705/35 |
| 7,003,719 B1 | 2/2006 | Rosenoff | |
| 7,124,031 B1 | 10/2006 | Hoffman | |
| 7,333,966 B2 | 2/2008 | Dozier | |
| 7,570,262 B2 * | 8/2009 | Landau et al. | 345/440 |
| 7,630,947 B2 | 12/2009 | Pandya | |
| 7,856,388 B1 * | 12/2010 | Srivastava et al. | 705/36 R |
| 2003/0135826 A1 | 7/2003 | Dozier | |
| 2003/0154208 A1 | 8/2003 | Maimon | |

(Continued)

FOREIGN PATENT DOCUMENTS

| | | |
|---|---|---|
| EP | 1843256 | 10/2007 |
| WO | WO-2005020091 | 3/2005 |
| WO | WO-2007044350 | 4/2007 |

OTHER PUBLICATIONS

Jon Espen Ingvaldsen et al, "Financial News Mining: Monitoring Continuous Streams of Text", Web Intelligence, 2006. WI 2006.

(Continued)

*Primary Examiner* — Jason Borlinghaus
(74) *Attorney, Agent, or Firm* — Duncan Galloway Egan Greenwald, PLLC; Kevin T. Duncan

(57) ABSTRACT

For automated text processing, the inventors devised, among other things, an exemplary system that automatically extracts financial events from various unstructured text based sources, such as press releases and news articles. Extracted events, such as mergers & acquisitions, earnings guidance reports, and actual earnings announcements, are represented as structured data records which can be linked, searched, and displayed and used as a basis for controlling accessing to the source documents and other related financial documents for named entities.

29 Claims, 5 Drawing Sheets

(56) References Cited

U.S. PATENT DOCUMENTS

| | | | |
|---|---|---|---|
| 2003/0212679 A1* | 11/2003 | Venkayala et al. | 707/6 |
| 2004/0210443 A1 | 10/2004 | Kuhn | |
| 2005/0102259 A1 | 5/2005 | Kapur | |
| 2005/0131935 A1 | 6/2005 | O'Leary | |
| 2006/0052945 A1 | 3/2006 | Rabinowitz | |
| 2006/0222239 A1* | 10/2006 | Bargeron et al. | 382/159 |
| 2006/0253274 A1 | 11/2006 | Miller | |
| 2006/0288268 A1* | 12/2006 | Srinivasan | G06F 17/245 715/210 |
| 2007/0005578 A1 | 1/2007 | Patman | |
| 2009/0326926 A1* | 12/2009 | Landau | G06F 17/30548 704/9 |

OTHER PUBLICATIONS

International Search Report, PCT/US2008/088040, dated Feb. 6, 2009.

Rau L F Ed—IEEE: "Extracting company names from text", Proceedings of Conference on AI Applications, Miami Beach, Feb. 24-28, 1991.

Ing Xiao et al: "A global rule induction approach to information extraction", Proceedings 15th IEEE International Conference on Tools with Artificial Intelligence. ICTAI 2003.

Teresa Chung, et al., "Identifying Technical Vocabulary", System vol. 32, 2004 pp. 251-263.

Christopher Dozier, et al., "Automatic Extraction and Linking of Person Names in Legal Text", Proceedings of RIAO, Apr. 2000, p. 1305-1321.

Yang Huizhong, "A new technique for identifying scientific/technical terms and describing science texts", Journal of ASsoc for Literary and Linguistic Comp., vol. 1 pp. 93-103, 1986.

International Search Report, PCT/US2009/032695, dated Oct. 22, 2009.

* cited by examiner

FINANCIAL EVENT AND RELATIONSHIP EXTRACTION

RELATED APPLICATIONS

This application claims priority to U.S. patent application Ser. No. 12/341,926, which was filed Dec. 22, 2008, and to U.S. Provisional Application 61/063,047 which was filed Jan. 30, 2008. Both of these applications are incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2007-2008, Thomson Reuters Global Resources.

TECHNICAL FIELD

Various embodiments of the present invention concern extraction of data and related information from documents, such as identifying and tagging names and events in text and automatically inferring relationships between tagged entities, events, and so forth.

BACKGROUND

The present inventors recognized a need to provide information consumers relational and event information about entities, such as companies, persons, cities, that are mentioned in electronic documents, particularly financial documents. For example, documents, such as news feeds, SEC (Securities and Exchange Commission) filings may indicate that Company A merged with or is rumored to be merging with Company B, or that Company C announced actual or projected earnings of X dollars per share.

However, because of language variations and the unstructured nature of many of the documents, automatically discerning the relational and event information about these entities is difficult and time consuming even with state-of-the art computing equipment.

SUMMARY

To address this and/or other needs, the present inventors devised, among other things, systems and methods for named-entity tagging and event and relationship extraction from documents, such as financial news articles and press releases.

The exemplary system automatically extracts financial events from various unstructured text based sources, such as press releases and news articles. Extracted events, such as mergers & acquisitions, earnings guidance reports, and actual earnings announcements, are represented as structured records.

To achieve this end, the exemplary system includes a set of recognizers, a set of text segment classifiers, and a set of relationship extractors. The set of recognizers receive input text and tag, resolve, and normalize entities, monetary amounts, and temporal indicators in the text segments, such as sentences. Receiving the text segments, the text segment classifiers classify what types of events, such as financial events, the text segments may include, and route to an appropriate one of a set of relationship extractors. For a text segment that includes an event, such as a mergers and acquisition event, the relationship extractor determines the role of named entities in the text segment within the event, associated monetary values, and/or timing or status of the event.

DETAILED DESCRIPTION OF THE EXEMPLARY EMBODIMENT(S)

This description, which incorporates the Figures and the claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Named-Entity Tagging and Resolution System

Figure 1:
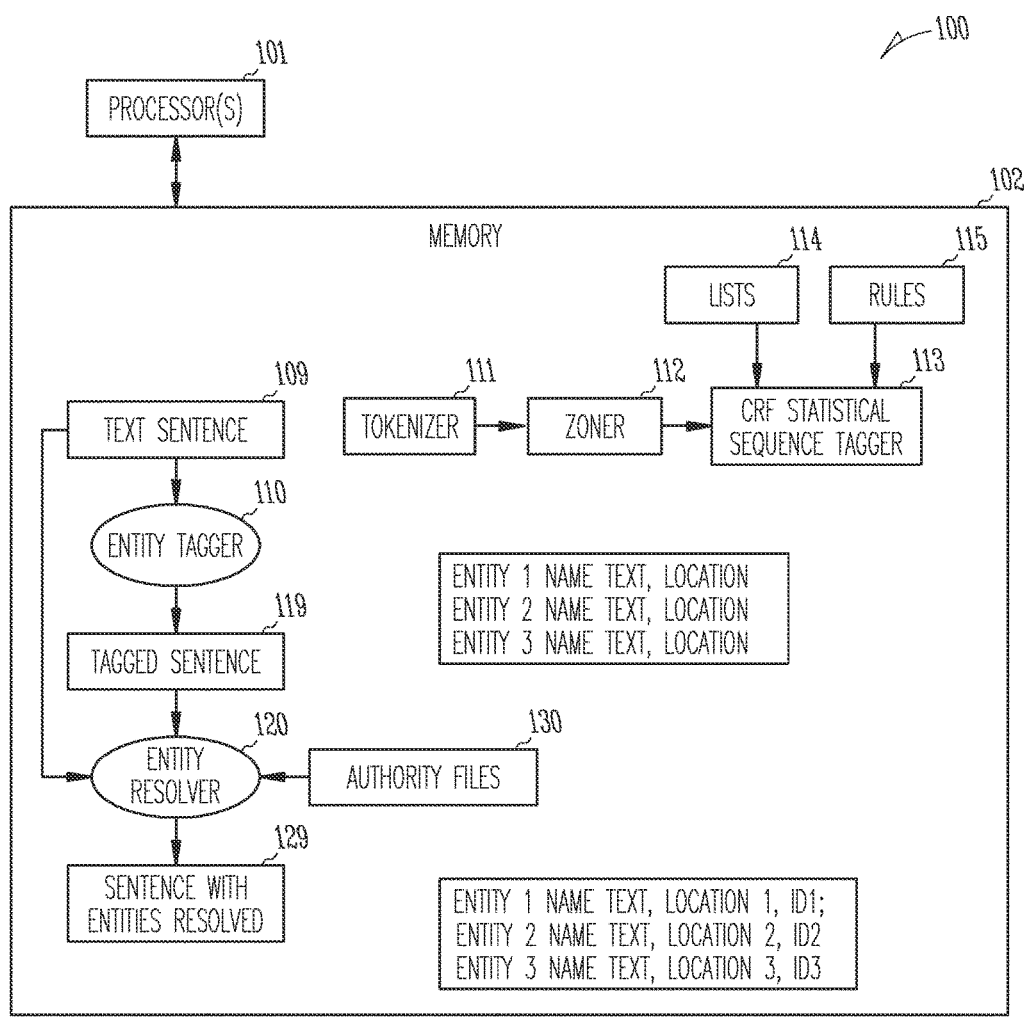
FIG. 1 is a block and flow diagram of an exemplary system for named-entity tagging, resolving and event extraction, which corresponds to one or more embodiments of the present invention.

FIG. 1 shows an exemplary named entity tagging and resolving system 100. In addition to processors 101 and a memory 102, system 100 includes an entity tagger 110, an entity resolver 120, and authority files 130. (Tagger 110, resolver 120, and authority files 130 are implemented using machine-readable data and/or machine-executable instructions stored on memory 102, which may take a variety of consolidated and/or distributed forms.

Entity tagger 110, which receives textual input in the form of documents or other text segments, such as a sentence 109, includes a tokenizer 111, a zoner 112, and a statistical tagger 113.

Tokenizer 111 processes and classifies sections of a string of input characters, such as sentence 109. The process of tokenization is used to split the sentence or other text segment into word tokens. The resulting tokens are output to zoner 112.

Zoner 112 locates parts of the text that need to be processed for tagging, using patterns or rules. For example, the zoner may isolate portions of the document or text having proper names. After that determination, the parts of the text that need to be processed further are passed to statistical sequence tagger 113.

Statistical sequence tagger 113 (or decoder) uses one or more unambiguous name lists (lookup tables) 114 and rules 115 to tag the text within sentence 109 as company, person, or place or as a non-name. The rules and lists are regarded herein as high-precision classifiers.

Exemplary pattern rules can be implemented using regex+ Java, Jape rules within GATE, ANTLR, and so forth. A sample rule for illustration dictates that "if a sequence of words is capitalized and ends with "Inc." then it is tagged as a company or organization. The rules are developed by a human (for example, a researcher) and encoded in a rule formalism or directly in a procedural programming language. These rules tag an entity in the text when the preconditions of the rule are satisfied.

Exemplary name lists identify companies, such as Microsoft, Google, AT&T, Medtronics, Xerox; places, such as Minneapolis, Fort Dodge, Des Moines, Hong Kong; and drugs, such as Vioxx, Viagra, Aspirin, Penicillin. In the exemplary embodiment, the lists are produced offline and made available during runtime. To produce the list, a large corpus of documents, for example, a set of news stories, is passed through a statistical model and/or various rules (for example, a conditional random field (CRF) model) to determine if the name is considered unambiguous. Exemplary rules for creating the lists include: 1) being listed in a common noun dictionary; and 2) being used as company name more than ninety percent of the time the name is mentioned in a corpus. The lookup tagger also finds systematic variants of the names to add to the unambiguous list. In addition, the lookup tagger guides and forces partial solutions. Using this list assists the statistical model (the sequence tagger) by immediately pinning that exact name without having to make any statistical determinations.

Examples of statistical sequence classifiers include linear chain conditional random field (CRF) classifiers, which provide both accuracy and speed. Integrating such high precision classifiers with the statistical sequence labeling approach entails first modifying the feature set of the original statistical model by including features corresponding to the labels assigned by the high-precision classifiers, in effect turning "on" the appropriate label features depending on the label assigned by the external classifier. Second, at run time, a Viterbi decoder (or a decoder similar in function) is constrained to respect the partially labeled or tagged sequences assigned by the high-precision classifiers.

This form of guided decoding provides several benefits. First, the speed of the decoding is enhanced, because the search space is constrained by the pretagging. Second, results are more consistence, because three sources of knowledge are taken account: the lists, the rules, and trained decoder statistical model. The third benefit is an ease of customization that stems from an elimination of a need to retrain the decoder if new rules and list items are added.

Figure 2:
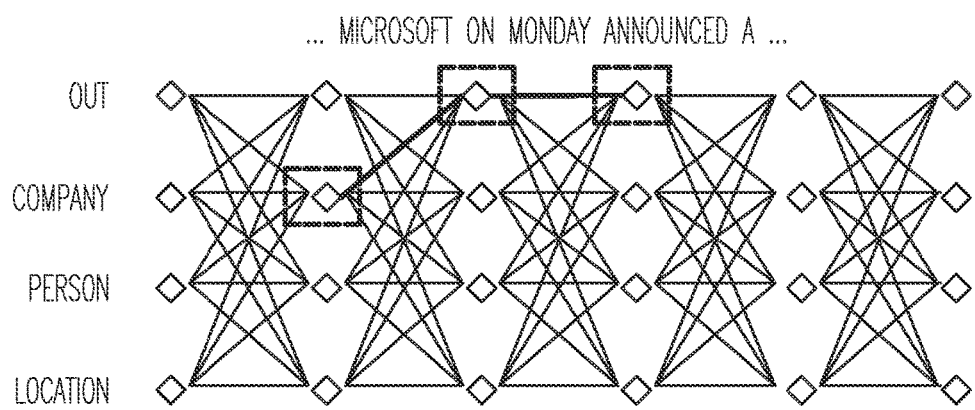
FIG. 2 is a diagram illustrating guided sequence decoding for named-entity tagging which corresponds to one or more embodiments of the present invention.

FIG. 2 is a conceptual diagram showing how a text segment "Microsoft on Monday announced a" is pretagged and how this pretagging (or pinning) constrains the possible tags or labeling options that a decoder, such as Viterbi decoder, has to process. In the Figure, the term Microsoft is tagged or pinned as a company based on its inclusion in a list of company names; the term Monday is marked as "out" based on its inclusion of a list of terms that should always be marked as "out"; and the term "on" is marked as out based on a rule that it should be marked as "out", if it is followed by an term that is marked as "out" in this case the term "Monday."

In the exemplary embodiment, the statistical sequence tagger calculates the probability of a sequence of tags given the input text. The parameters of the model are estimated from a corpus of training data, that is, text where a human has annotated all entity mentions or occurrences. (Unannotated text may also be used to improve the estimation of the parameters.) The statistical model then assembles training data, develops a feature set and utilizes rules for pinning. Pinning is a specific way to use a statistical model to tag a sequence of characters and to integrate many different types of information and methods into the tagging process.

The statistical model locates the character offset positions (that is, beginning and end) in the document for each named entity. The document is a sequence of characters; therefore, the character offset positions are determined. For example, within the sentence "Hank's Hardware, Inc. has a sale going on right now," the piece of text "Hank's Hardware, Inc." has an offset position of (0, 20). The sequence of characters has a beginning point and an ending point; however the path in between those points varies.

After the character offset positions are located, information about the entity is identified through the use of features. This information ranges from general information (that is, determining text is last name) to specific information (e.g., unique identifier). The exemplary embodiment uses the features discussed below, but other embodiments use other types and numbers amounts of features:

Regular expressions: contains an uppercase letter, last char is a dot, Acronym format, contains a digit, punctuation
  Single word lists: last names, job titles, loc words, etc.
  Multi-word lists: country names, country capitals, universities, company names, state names, etc.
  Combination features: title@-1 AND (firstname OR last)
  Copy features: copies features from one token to neighboring tokens, for example, the token two to the left of me is capitalized (Cap@-2)
  The word itself features: "was" has the feature was@0
  First-sentence features: copy features from 1st sentence words to others
  Abbreviation feature: copy features of name to mentions of abbr.

The features computation does not calculate features for isolated pinned tokens. The computations combine hashes, combine tries, and combine regular expressions. Features are only computed when necessary (for example punctuation tokens are not in any hashes so do not look them up). Once the model has been trained, the Viterbi algorithm (or an algorithm similar in function) is used to efficiently find the most probable sequence of tags given the input and the trained model. After the algorithm determines the most probable sequence of tags, the text, such as tagged sentence 119, where the entities are located is passed to a resolver, such as entity resolver 120.

Entity resolver 120 provides additional information on an entity by matching an identifier for an external object within authority files 130 to which the entity refers. The resolver in the exemplary embodiment uses rules instead of a statistical model to resolve named entities. In the exemplary embodiment, the external object is a company authority file containing unique identifiers. The exemplary embodiment also resolves person names.

The exemplary resolver uses three types of rules to link names in text to authority file entries: rules for massaging the authority file entries, rules for normalizing the input text, and rules for using prior links to influence future links. Other embodiments include integrating the statistical model and resolver.

This list along with the original text is the input to an entity resolver module. The entity resolver module takes these tagged entities and decides which element in an authority file the tagged entity refers. In the exemplary embodiment, authority file 130 is a database of information about entities. For example an authority file entry for Swatch might have an address for the company, a standard name such as Swatch Ltd., the name of the current CEO, and a stock exchange ticker symbol. Each authority file entry has a unique identity. In the previous example a unique id could be, ID:345428, "Swatch Ltd.", Nicholas G. Hayek Jr., UHRN.S. The goal of the resolver is to determine which entry in the authority file matches corresponds a name mention in text. For example, it should figure out the Swatch Group refers to entity ID:345428. Of course, resolving names like Swatch is relatively easy in comparison to a name like Acme. However, even for names like Swatch, a number of related but different companies may be possible referents. What follows is a heuristic resolver algorithm used in the exemplary embodiment:

Heuristic Resolver Algorithm for Companies

Iterate through entities tagged by the CRF:
If entity tagged as ORG:
If a "do not resolve" ORG (i.e., stock exchange abbreviations):
set ID attribute to "NOTRESOLVED"
Else:
If entity in the company authority file,
set ID attribute to company ID
Else:
set ID attribute to "NOTRESOLVED"
Iterate through NOTRESOLVED entities:
If E is a left-anchored substring of a resolved company:
set ID attribute to already resolved company substring match ID,
change the tag kind to ORG, if necessary
If E is an acronym of an already-resolved company:
set ID attribute to already resolved non-acronym company ID,
change the tag kind to ORG, if necessary Note that the exemplary entity tagger and variations thereof is not only useful for named entity tagging. Many important data mining tasks can be framed as sequence labeling. In addition, there are many problems for which high precision (but low recall) external classifiers are available that may have been trained on a separate training set.

Exemplary Event and Relationship Extraction System

Figure 3:
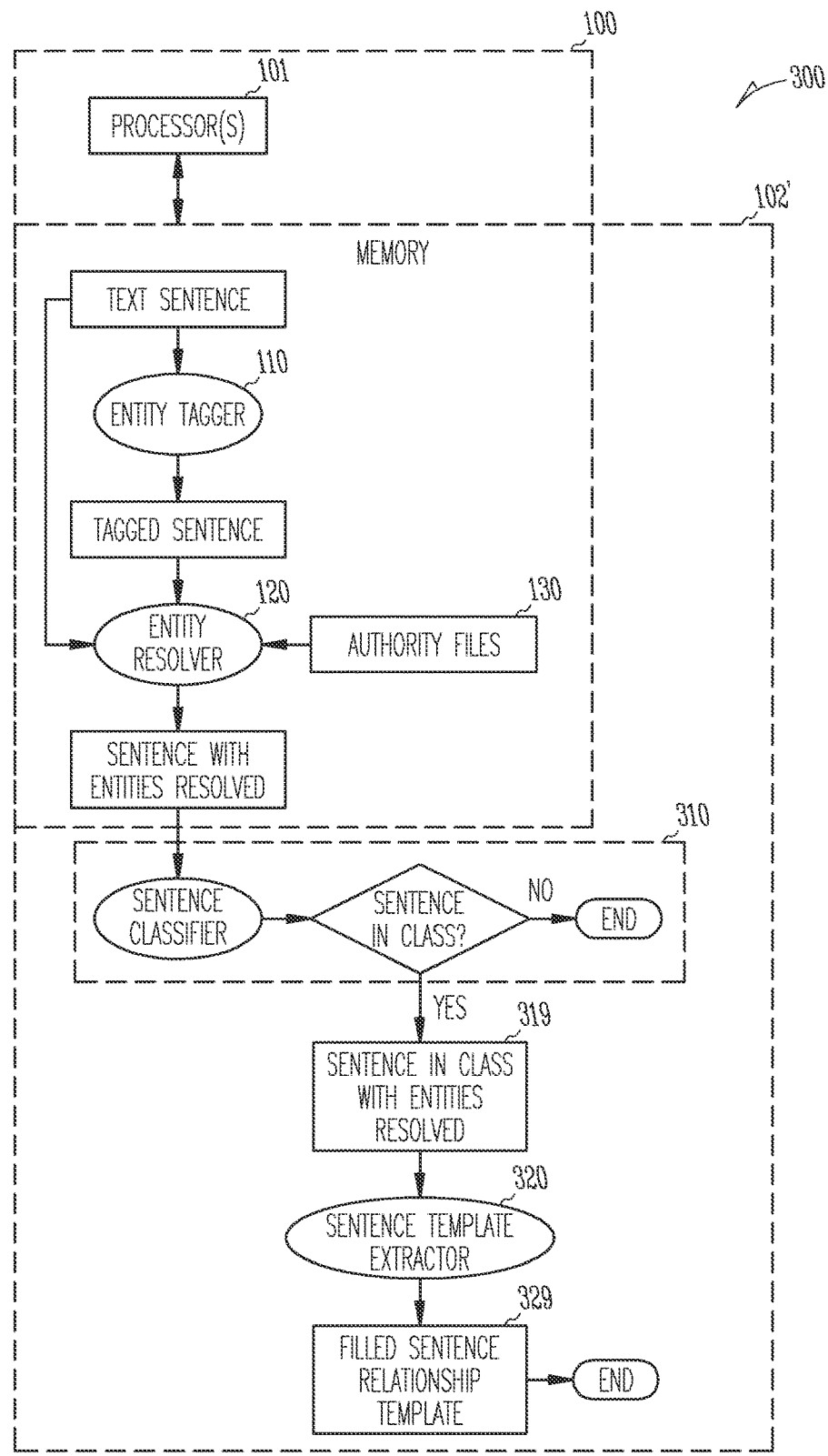
FIG. 3 is a block diagram of an exemplary named-entity tagging, resolution, and event extraction system corresponding to one or more embodiments of the present invention.

FIG. 3 shows an exemplary system 300 which builds onto the components of system 100 with a classifier 310 and a template extractor 320, which are shown as part of memory 102, and understood to be implemented using machine-readable and machine-executable instructions.

Classifier 310, which accepts tagged and resolved text such as sentence 129 from resolver 120, identifies sentences that contain extractable relationship information pertaining to a specific relationship class. For example, if one is interested in the hiring relationship where the relationship is hire (firm, person), the filter (or classifier) 312 identifies sentence (1.1) as belonging to the class of sentences containing a hiring or job-change event and sentence (1.2) as not belonging to the class.

(1.1) John Williams has joined the firm of Skadden & Arps as an associate.
(1.2) John Williams runs the billing department at Skadden & Arps.

The exemplary embodiment implements classifier 310 as a binary classifier. In the exemplary embodiment, building this binary classifier for relationship extraction entails:

1) Extracting articles from a target database;
2) Splitting sentences in all articles and loading to a single file;
3) Tagging and resolving types of entities relevant to a relationship type that occur within each sentence;
4) Selecting from set of sentences all sentences that have the minimal number of tagged entities needed to form a relationship of interest. This means for example that at least one person name and one law firm name must be specified in a sentence for it to contain a job change event. Sentences containing requisite number of tagged entity types are called candidate sentences;
5) Identifying 500 positive instances from the candidate set and 500 negative instances. A sentence in the candidate set that actually contains a relationship of interest is called a positive instance. A sentence in the candidate set that does not contain a relationship of interest is called a negative instance. All sentences within the candidate set are either positive or negative instances. These sampled instances should be representative of their respective sets and should be found as efficiently as possible;
6) Creating classifier that combines selected features with selected training methods. Exemplary training methods include naive Bayes and Support Vector Machine (SVM.) Exemplary features include co-occurring terms and syntax trees connecting relationship entities; and
7) Testing the classification of randomly selected sentences from candidate pool. After testing the exemplary embodiment evaluates first hundred sentences classified as positive (for example, job change event containing) and first hundred classified as negative, computing precision and recall and saving evaluated sentences as gold data for future testing.

A range of filters that are either document-dependent filters or complex relation detection filters based on machine learning algorithms are developed and tools that easily retarget new document types. The structure of a document type provides very reliable clues on where the sought after information can be found. Ideally, the filter is flexible and automatically detects promising areas in a document. For example, a filter that includes a machine learning tool (for example Weka) that detects promising areas and produces pipelines that can be changed according to the relevant features needed for the task.

Depending on the requirements, different levels of co-reference resolution can be implemented. In some domains, no co-reference resolution is used. Other situations use a relatively simple set of rules for co-reference resolution, based on recent mentions in the text and identifiable attributes (i.e., gender, plurality, etc.) of the interested named entities. For example, in the job change event, almost all co-reference issues are solved by simply referring backward to the most recent mention of the matching entity type (that is, law firm or lawyer name).

Template extractor 320 extracts event templates from positively classified sentences, such as sentence 319, from classifer 310. In the exemplary embodiment, extracting templates from sentences involves identifying the name entities participating in the relationship and linking them together so that their respective roles in the relationship are identified. A parser is utilized to identify noun phrase chunks and to supply a full syntactic parse of the sentence.

In the exemplary embodiment, implementing extractor 320 entails:

1) Creating gold data by taking positive example sentences from classification phase and manually generating appropriate template records. The user is automatically presented with all possible templates which could be generated from the sentence and asking the user to select the one that is correct;
2) Taking 400 sentences from gold data set for training data and develop extraction programs based on one or more of the following technologies: association rules, chunk kernel based on chunks, CRF, and tree kernel based on syntactic structure;
3) Testing solutions on 100 held out test samples;
4) Combining classifier with extractor to test precision using unseen data. For instance, a sentence containing a job change event is one that describes an attorney joining a law firm or other organization in a professional capacity. The target corpora from which job change events are extracted are legal newspaper databases. The minimal number of tagged entities which qualify a sentence for inclusion in the candidate set is one lawyer name and one legal organization name. One way to efficiently collect positive and negative training instances is to stratify samplings. This can be done by sorting the sentences according to the head word of the verb phrase that connects a person with a law firm in the sentence. Then collect all head verbs that occur at least five times under a single bucket. After collection, select five example sentences from each bucket randomly and mark them as either positive or negative examples. For each bucket that yields only positive examples, add all remaining instances to the positive example pool. And for each bucket that yields only negative examples, add all examples to the negative examples group. If there are less than 500 positive examples or less than 500 negative examples, manually score randomly selected sentences until 500 examples of each time are identified. The job change event extractor moves identified entities from a positively classified job change event sentence into a structured template record. The template record identifies the roles the named entities and tagged phrases play in the event.

The template below (which also represents a data structure) is in reference to sentence 1.1 above.

| Role | Value | Entity ID |
|---|---|---|
| Attorney | John Williams | A23456 |
| Firm | Skadden & Arps | F56748 |
| Position | Associate | P234 |

Various assumptions are incorporated in the exemplary embodiment. One main assumption is that the identity of the entities is usually independent of the way of talking about an event or relationship. Another assumption is that the extraction of sentences deemed paraphrases based upon the equality of constituent entities and time window is relatively error-free. The precision of this latter filtering step is improved by having other checks such as on the cosine similarity between the documents in which the two sentences are found, similarity of titles of the documents etc. This approach entails:

1) Providing a large corpus of documents preferably having the property that several documents talking about the same event or relationship from different authors are easy to find. One example is a time-stamped news corpus from different news sources, where the same event is likely to be covered by different sources;
2) Using a named entity recognizer to tag the entities in the corpus with reasonable accuracy. Clearly the set of entities that need to be covered by the NER (named-entity resolver) depends upon the extraction problem;
3) Providing an indexer for efficient search and retrieval from the corpus;
4) Providing a human generated list of high-precision sentences with the entities replaced by wild-cards. For example, for MA, a human might provide a rule "ORG1 acquired ORG2" means this is an MA sentence with ORG1 being the buyer and ORG2 being the target.

Figure 4:
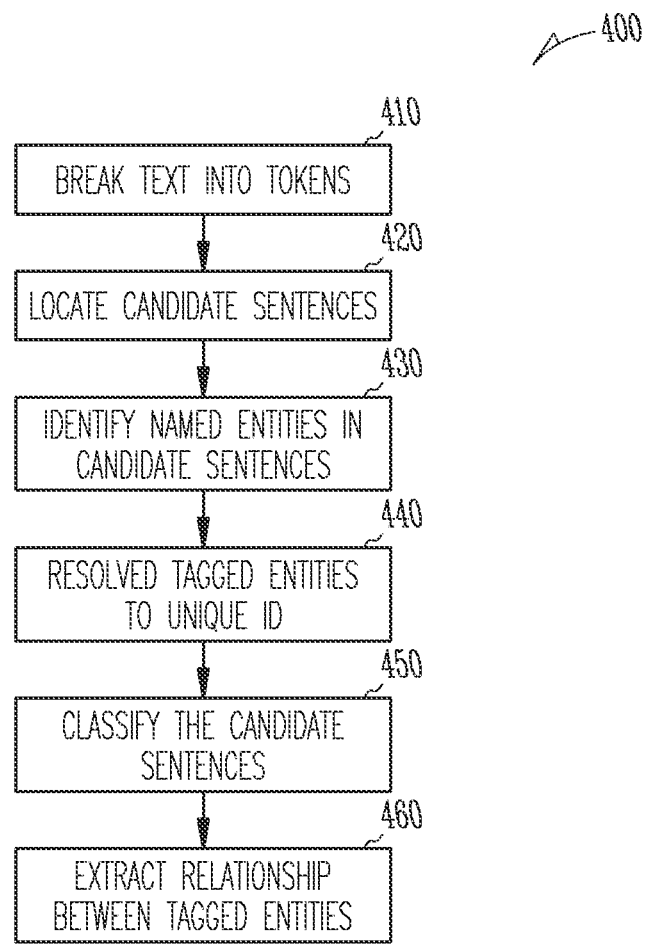
FIG. 4 is a flow chart of an exemplary method of named-entity tagging and resolution and event extraction corresponding to one or more embodiments of the present invention.

Exemplary Methods of Operating a Named-Entity Tagging, Resolution and Event and Relationship Extraction System FIG. 4 shows a flow chart 400 of an exemplary method of operating a named entity tagging, resolution, and event extraction system, such as system 300 in FIG. 3. Flow chart 300 includes blocks 410-460, which are arranged and described serially. However, other embodiments also provide different functional partitions or blocks to achieve analogous results.

Block 410 entails breaking the extracted text into tokens. Execution proceeds at block 220.

Block 420 entails locating parts of the extracted text that need to be processed. In the exemplary embodiment, this entails use of zoner 112 to locate candidate sentences for processing. Execution then advances to block 230.

Block 430 entails finding the named entities within the processed parts of extracted text. Then the entities of interest in the candidate sentences are tagged. Candidate sentences are sentences from target corpus that might contain a relationship of interest. For example, one embodiment identifies text segments that indicate job-change events; another identifies segments that indicate merger and acquisition activity; a yet another identifies segments that may indicate corporate income announcements. Execution continues at block 440.

Block 440 entails resolving the named entities. Each entity is attached to a unique ID that maps the entity to a unique real world object, such as an entry in an authority file. Execution then advances to block 450.

Block 450 classifies the candidate sentences. The candidate sentences are classified into two sets: those that contain the relationship of interest and those that do not. For example, one embodiment identifies text segments that indicate job-change events; another identifies segments that indicate merger and acquisition activity; a yet another identifies segments that may indicate corporate income announcements. When the text is classified, execution advances to block 460.

Block 460 entails extracting the relationship of interest using a template. More specifically, this entails extracting entities from text containing the relationship and place the entities in a relationship template that properly defines the relationship between the entities. When the template is completed, the extracted data may be stored in a database but it may also involve more complex operations such as representing the data according a time line or mapping it to an index.

Some embodiments of the present invention are implemented using a number of pipelines that add annotations to text documents, each component receiving the output of one or more prior components. These implementations use the Unstructured Information Management Architecture (UIMA) framework and ingest plain text and decomposes the text into components. Each component implements interfaces defined by the framework and provide self-describing metadata via XML descriptor files. The framework manages these components and the data flow between them. Components are written in Java or C++; the data that flows between components is designed for efficient mapping between these languages. UIMA additionally provides a subsystem that manages the exchange between different modules in the processing pipeline. The Common Analysis System (CAS) holds the representation of the structured information Text Analysis Engines (TAEs) add to the unstructured data. The TAEs receive results from other UIMA components and produce new results that are added to the CAS. At the end of the processing pipeline, all results stored in the CAS can be extracted from there by the invoking application (for example, database population) via a CAS consumer. Primitive TAEs (for example, tokenizer, sentence splitter) can be bundled into an aggregate TAE. Other embodiments use alternatives to the UIMA.framework.

Exemplary Financial Event Extraction and Resolution System and Method

Figure 5:
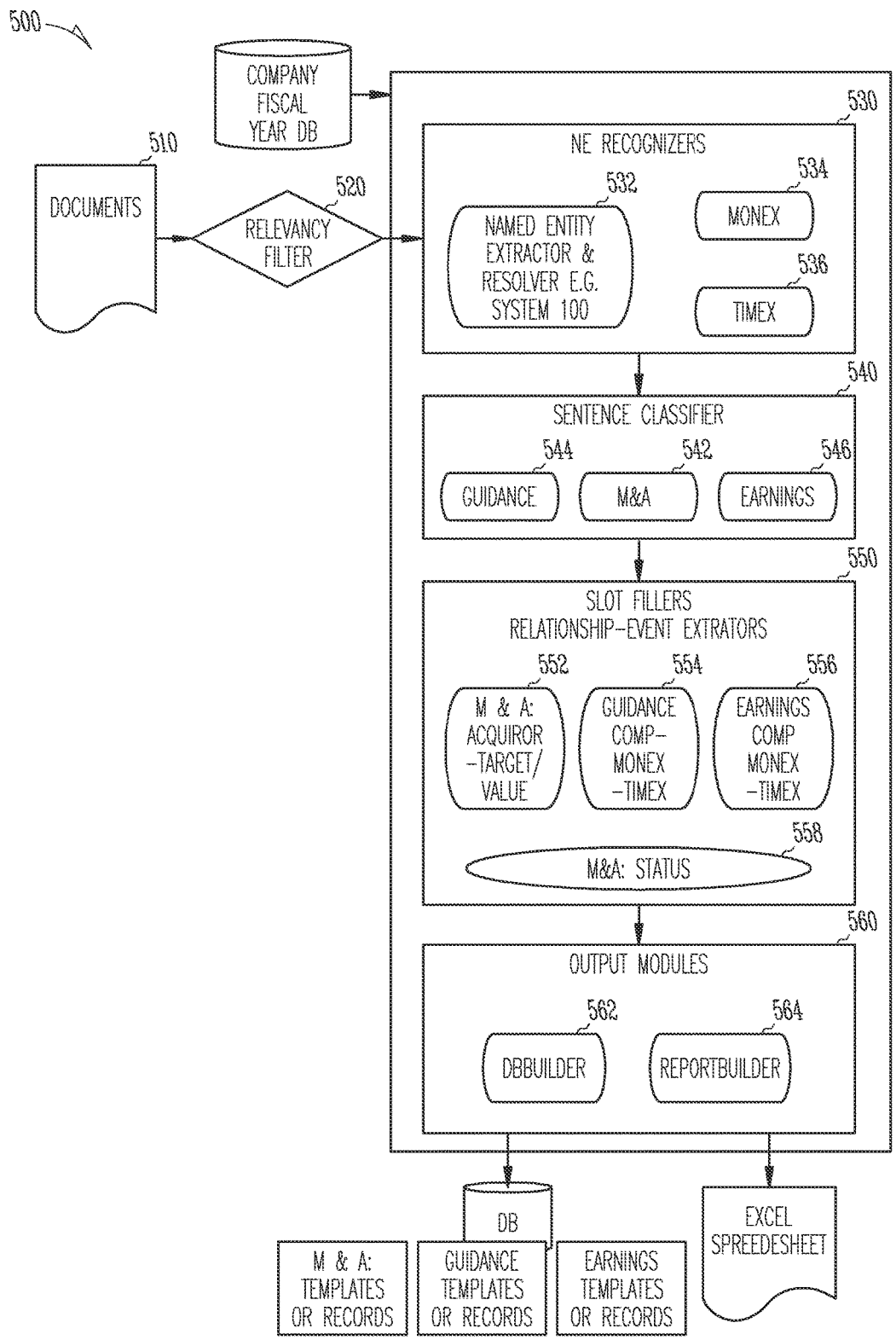
FIG. 5 is a block and flow diagram of another exemplary system for named-entity tagging and resolving, and event extraction, which corresponds to one or more embodiments of the present invention.

FIG. 5 shows an extension or enhancement of system 300 in the form of a system 500 that automatically extracts and resolves financial events from text documents. Although not explicitly shown in this drawing, system 100 is implemented using one or more processors and memory devices, which store data and machine-readable and executable instructions sets. The processors and memory devices may be organized or arranged in any desirable centralized or distributed computing architecture. Some embodiments implement system 500 as a Java pipeline which can easily be integrated into an editorial workflow. The system can be configured to work in batch mode or as a web service. Additionally, the system can be configured to operate in batch mode or as a web service.

In particular, system 500 includes a set of electronic documents 510, a relevancy filter 520, recognizers 530, text segment classifiers 540, template or slot fillers 550, and output module 560.

Documents 510 includes a set of unstructured and/or structured textual documents. For example, in the exemplary embodiment documents 510 includes press releases, news wire stories, SEC (Securities and Exchange Commission) documents. Documents 510 are input in batch or serial fashion to relevancy filter 520.

Relevancy filter 520 includes one or more financial event classifiers. In the exemplary embodiment, filter 520 determines, using one or more machine-learning-based classifiers, whether the documents are likely to include text that is representative of a financial event that can be extracted by the system. Exemplary financial events include merger & acquisitions, earnings announcements, or earnings guidance reports. Determinations can be based, for example, on whether two companies are mentioned in a single sentence or within some other defined text segment, such as a paragraph or within a certain distance of each other, or whether a monetary amount is mentioned in proximity to a company name or proximate terms correlated with occurrence of a financial event. Determinations may also be based on inclusion of terms such as merger, acquisition, earnings, and related roots, stems, synonyms, and so forth. Documents that are determined unlikely to include a financial event are excluded from further processing, whereas those that are deemed likely to include such events are input to recognizers 530.

Recognizers 530 extracts and resolves companies, percentage and money amounts in the same general manner as described for system 100. In particular recognizers 530 includes a named entity extractor and resolver 532, a monetary extractor 534, and a temporal extractor 536. Named entity extractor and resolver 532 in the exemplary embodiment is identical to system 100 shown in FIG. 1. Monetary extractor 534 identifies and tags percent expressions, monetary expressions, including monetary ranges, the color of the money (actual earnings, or projected earnings, etc.), and possibly a trend (for example, up or down). In the exemplary embodiment, this entails normalizing the percent and money amount to U.S. currencies, for example. Temporal extractor 536 identifies and tags temporal terms and/or windows. In the exemplary embodiment, the temporal extractor (for example ANTLR lexer, which is also used for parsing monetary expressions) also grounds time expressions (e.g., Q2 means second quarter of the current year) and converts to an ISO time value. The exemplary embodiment implements this extractor programmatically using the following:

TIMEX: {timex.initialize( );} (VAGUE|PERIOD|SPECIFIC|INDEXICAL) {timex.computeValue( );}
Class TimexGroundedInfo records the temporal meaning of the expression and computes the grounded time.
Indexicals: Today, tomorrow, Wednesday
Specific: 2008-05-06T02:30:30
Periods: 3 months
Vague: Late Monday
Anaphoric expressions: This period To achieve this grounding functionality, the exemplary system utilizes a database containing fiscal year information for various companies. Some embodiment restrict tagging of time expressions to those greater than one month and those that are current relative to the publication date of the document. Also, if there are multiple valid time expressions the one closest to any monetary expression is tagged, and the other omitted unless there is a corresponding monetary expression. If there is a valid time expression, it is extracted Output of recognizers 530, which takes the form of tagged sentences or other text segments, is feed to sentence classifiers 540.

Sentence classifiers 540 (more generally text segment classifiers) include a set of classifiers for directing processing of the sentences or text segments to one or more of record or template filling modules within slot fillers 550. Specifically, sentence classifiers 540 includes an M&A (mergers & acquisitions) event classifier 542, a guidance event classifier 544, and an earnings event classifier 546.

M&A classifier 542 determines whether tagged and resolved sentences (or more generally text segments) from recognizers 530 include an M&A event. Within the exemplary embodiment, an M&A event is defined as a relation between two companies and a money amount (or a percentage of stake). The two companies in an M&A event are the acquirer and the target. An M&A event also has a status (i.e., rumor, intended, announced, pending, completed, withdrawn). An example text containing an M&A event is shown below along with the corresponding structured event record (data structure) produced by M&A slot filler (relationship extractor) 552 and status classifier 558.

Sample Merger & Acquisition Text

Under the deal announced Thursday, Glu Mobile (GLUU) will pay about $14.7 million in AGGREGATE VALUE to acquire Beijing Zhangzhong MIG Information Technology Co. Ltd.

Extracted Merger & Acquisition Template (Record)

| | |
|---|---|
| Acquirer | GLU MOBILE |
| Target | BEIJING ZHANGZHONG MIG INFORMATION TECHNOLOGY CO. |
| Value | 1.47E+07 |
| Value Type | USD |
| Value Measure | AGGREGATE VALUE |
| Value Text | $14.7 million |
| Status | ANNOUNCED |

In the exemplary embodiment, creating a structured template given an input document involves identifying whether the document contains an M&A event and filling the template(s) with the correct entity information, such as company name, company IDs, or normalized money amount.

M&A classifier 542 is implemented using a semi-supervised machine-learning approach to determine which sentences have acquirer-target pairs of companies. Rules-based approached is then used to associate one or more merger valuation figures or values with the acquirer-target pair. M&A status classifier 558 determines a status for the M&A event. The exemplary embodiment implements classifier 558 using a semi-supervised machine learning approach.

The success of any supervised machine learning approach relies on having high quality training data. But training data requires the manual tagging of hundreds of examples, and can therefore be expensive and time consuming to generate. To alleviate this bottleneck, the exemplary embodiment employs a framework for generating large amounts of training data semi-automatically from an unlabeled, time-stamped news corpus. Such methods are called 'semi-supervised', because they require less human intervention in the training process. Sometimes, multiple algorithms can be used to train each other (co-training) or high recall features can be used to train other features (surrogate learning). Based on a small set of 15 seed patterns (e.g., "acquisition of ORG"), we derived the training data from a large unlabeled news corpus. The training data was then used to learn models that identify the different pieces of information required to extract a structured record for each M&A event from the input document.

The minimal number of tagged entities which qualifies a sentence for inclusion in the candidate set is two company names. To help collect training data, the exemplary embodiment uses structured records from merger and acquisitions database on Westlaw® information-retrieval system (or other suitable information-retrieval system) to identify merger and acquisition events that have taken place in the recent past.

To efficiently identify positive training instances from the candidate set, the exemplary embodiment finds sentences that contain the names of entities that match these records and were published during the time frame over which the merging event took place. To identify negative instances, the exemplary embodiment selects sentences that contain companies known to not have been involved in a merger or acquisition. Once the system determines that a text segment includes an M&A event, the segment is passed to M&A event extractor 552 which copies or places identified entities and tagged expressions from a positively classified M & A change event sentence (text segment) into a structured template record that identifies the roles of the named entities and tagged expressions in the event.

Guidance event classifier 544 determines whether tagged and resolved sentences (or more generally text segments) from recognizers 530 include a guidance event. Within the exemplary embodiment, a guidance event is defined as a relation between a company, a complex money amount and a future time period. The complex money amount is called MONEX for our purposes and can contain a money amount (or range), the color of the money (e.g., earnings) and possibly a trend (for example, up or down). An example of a guidance statement and the corresponding event template produced by guidance event extractor 554 is shown below.

Sample Guidance Text

CA boosted its full-year 2008 forecast, now expecting earnings of 87 cents to 91 cents a share and revenue in the range of $4.15 billion to $4.2 billion. (tagged terms or phrases are highlighted in bold.)

Extracted Guidance Template

| | |
|---|---|
| Company | CA Inc. |
| Company Id | C000001193 |
| Period | 2008P1Y |
| Measure | EPS |
| Low Value | 0.87 |
| High Value | 0.91 |
| Value Type | Denominated |
| Currency | USD |
| Trend | Up |

Because the language used in guidance events is somewhat formulaic, the exemplary guidance event classifier uses a rule-based approach to determine if a text segment includes a guidance event. One aspect of this determination is determining whether a time period tagged in the text segment is a future time period relative to a current time period or publication date associated with the document that contains the text segment. In addition, the color of the MONEX is determined. Earnings of $10-$12 a share describes a MONEX containing the following slots: [MinValue: 10, MaxValue: 12, Currency: USD, Measure: EPS]. Then, it identifies the respective company and the time period.

Earnings event classifier 546 determines whether tagged and resolved sentences (or more generally text segments) from recognizers 530 include an earnings event. The exemplary embodiment defines an earnings event as a relation between a company, a complex money amount and a past time period. The complex money amount is called MONEX for our purposes and can contain a money amount (or range), the color of the money (e.g., earnings) and possibly a trend (e.g. up). An example of an earnings event and its corresponding structured record produced by earnings event extractor 556 are shown below.

Sample Earnings Text

Genpact Ltd., (G) the Gurgaon, India, manager of business processes for companies, reported third-quarter earnings rose 27% on 32% higher revenue. Earnings reached $16.3 million from $12.8 million in the year-earlier period.

Extracted Earnings Template

| Company | Genpact |
|---|---|
| Company Id | C902357116 |
| Period | 2007F3Q |
| Measure | CSH |
| Value | 1.63E+07 |
| Value Type | Denominated |
| Currency | USD |
| Trend | Up |

Similar to the processing of guidance events, the exemplary embodiment uses a rule-based approach to classify earnings events because the underlying language is generally formulaic. In some embodiments, the minimal number of tagged entities which qualifies a sentence for inclusion in the candidate set (that is, as potentially including an earnings event) is one company name and the phrase "net income" or the word "profit". To efficiently find positive instances, the exemplary embodiment extracts net income information from SEC documents for particular companies and finds positive candidates when the named company in the sentence and the dollar amount or percentage increase in profit for a time period line up with information from an SEC document. Negative instances are found when the data for a particular company does not line up with SEC filings. The earnings event extractor 556 (net income announcement event extractor) moves identified entities from a positively classified net income announcement (earnings) event sentence into a structured template record. The template record identifies the roles the named entities and tagged phrases play in the event.

For a text segment to include a guidance or earnings event, some embodiments impose the rule that it must include at least one resolved company name which is not an analyst company (e.g., Thomson First Call, or MarketWatch) and one monetary expression.

In addition to text segment classifiers 540 and relationship extractors (slot fillers 550, system 500 includes output modules 560.

Output modules 560 includes a database builder module 562 and a report builder module 564. Database builder module 562 builds a database from the event templates or records that are filled by relationship extractors 550, enabling one to, for example, to readily access the event data using conventional search. Report builder Exemplary Extraction of Information from Tables Found in Text System 500 makes use of SEC filing data for example to determine timing, discern earnings trends, etc. To facilitate use of this data, the exemplary embodiment employs a novel system and methodology for extracting information from tables found in the text of these documents. One component of the table-data extractions system is an SVM classifier (or another classifier similar in function) that distinguishes tables from non-tables. Tables that are only used for formatting reasons are identified as non-tables. In addition, tables are classified as tables of interest, such as background, compensation, etc. The feature set comprises text before and after the tables as well as n-grams of the text in the table. The tables of interest are then processed according to the following:

1) label/value detection. The table has to be partitioned in the labels and the values. For the exemplary table below, the system determines that the money amounts are values and the rest are labels;

2) label grouping. Some labels are grouped together. For example, Eric Schmidt and his current position are one label. On the other hand, a table that contains a year and a list of term names (i.e. Winter, Spring, Fall) are not grouped together;

3) abstract table derivation. A derived Cartesian coordinate system leads to the notation that defines every value accordingly. [Name and Principal Position.Eric Schmidt Chairman of the Executive Committee and Chief Executive Officer.Year.2005, Annual Compensation.Salary($)]=1;

4) relation extraction. Given the abstract table representation, the desired relations are derived. The compensation relation, for example, is filled with: NAME: Eric Schmidt; COMPENSATION TYPE: salary; AMOUNT: 1; CURRENCY: $. Finally, an interpreter for the tables of interest is created. The input to the interpreter is a table and the output is a list of relations represented by the table.

| Name and PrincipalPosition | Year | Annual Compensation Salary($) | Bonus($) | other Annual Compensation($) |
|---|---|---|---|---|
| Eric Schmidt Chairman of the Executive Committee and Chief Executive Officer | 2005 | 1 | 1,630 | 24,741 |
| | 2004 | 81,432 | 1,556 | 0 |

For the exemplary embodiment, we downloaded hundreds of documents from Edgar database (EDGAR) and annotated 150 of them for training and evaluation. We converted the documents into XHTML using Tidy (Raggett) before annotating them.

TABLE 3

A compensation table

| Name and Principal Position | Fiscal Year | Annual Compensation | | | Long-Term | |
| | | Salary($) | Bonus($)(1) | Other Annual Compensation ($) | Compensation Awards Options (#) | All Other Compensation ($)(2) |
|---|---|---|---|---|---|---|
| John T. Chambers President, Chief Executive Officer and Director | 2005 | 350,000 | 1,300,000 | 0 | 1,500,000 | 8,977 |
| | 2004 | 1 | 1,900,000 | 0 | 0 | 0 |
| | 2003 | 1 | 0 | 0 | 4,000,000 | 0 |
| Mario Mazzola | 2005 | 447,120 | 557,737 | 0 | 600,000 | 7,424 |

TABLE 3-continued

A compensation table

| | | Annual Compensation | | | Long-Term | |
| --- | --- | --- | --- | --- | --- | --- |
| Name and Principal Position | Fiscal Year | Salary(S) | Bonus(S)(1) | Other Annual Compensation (S) | Compensation Awards Options (#) | All Other Compensation (S)(2) |
| Former Senior Vice President. Chief Development Officer (3) Charles H. Giancarlo | 2004 2003 | 464,317 447,120 | 666,850 764,897 | 0 0 | 600,000 500,000 | 5,726 2,905 |
| . . . | | | | | | |

Our information extraction system for genuine tables involve the following processes:
1. table classification
2. label row and column classification
3. table structure recognition
4. table understanding Process 1, which enhances efficiency, entails identifying tables that have a reasonable chance of containing the desired relation before other more computationally expensive processes are applied. The tables containing the desired information are quickly identified using relation-specific classifiers based on supervised machine learning.

Process 2 entails distinguish between label column and label rows from values inside those tables. This time, the same supervised machine learning approach is used, but the training data is different from that in Step 1.

In process 3, after those label rows and label column are identified, an elaborate procedure is applied to these complex tables to ensure that semantically coherent labels are not separated into multiple cells, or multiple distinct labels are not squashed into a cell. The goal here is to associate each value with their labels in the same column and the same row. The result of the Step 3 is a list of attribute-value pairs.

In process 4, a rule-based inference module goes through each of the attribute-value pairs and identifies the desirable ones to populate the officers and directors database.

The exemplary embodiment makes use of an annotation in performing the supervised learning employed in both process 1 and process 2. To make the exemplary system more robust against lexical variations and table variations, supervised machine learning is used in processes 1 and 2. In supervised learning, one of the most challenging and time-consuming tasks is to obtain the labeled examples. To facilitate reuse across different domains, the exemplary embodiment uses a scheme that reduces or minimizes the human annotation effort needed.

For the tables containing the desired information, the exemplary embodiment uses the following annotations:
1. isGenuine: a flag indicates that this is a genuine table or a non-genuine table.
2. relations: the relations that a table contain, such as "name+title", "name+age", "name+year+salary" or "name+year+bonus", or a combination of them.
3. isContinuous: a flag indicates that if this table is a continuation of the previous genuine table.
4. lastLabelRow: the row number of the last label row.
5. lastLabelColumn: the column number of the last label column associated with each relation.
6. valueColumn: the number of the column that contains the desired values for each relation.

The specified relations are used as training instances to build models for process 1. The information lastLabelRow and lastLabelColumn are used to build models to classify rows and column as labels rows or columns in process 2. In our guideline to annotators, we specifically ask them to annotate the column number of the last label column for each relation.

The need for such fine-grained annotation is best illustrated using an example. In Table 3, for relation "name+title", the last label column is 1, the column "name and principal position". But for relation "name+year+salary", the last label column is 3, "salary". For extracting multiple relations in a table, these relations might share the same last label column, but this is not always the case. As a result, there is a need to annotate the associated label column for each relation separately. The flag isContinuous indicates if the current table is a continuation of the previous table. If it is, the current table can "borrow" the boxhead from previous table since such information is missing. The exemplary embodiment eliminates tables marked with "isContinuous" flag during training, but kept those tables during evaluation. The annotation valueColumn can be used for automatic evaluation in the future.

There are a few rare instances where the default arrangement of boxhead and stub, as shown in Table 3, are swapped in the corpus. Currently in our annotation, we simply don't supply "valueColumn" for the relations since they don't apply. For table classification and table understanding tasks, this is not of much an issue, but the above annotation scheme would need to be further modified to capture such difference.

Table classification: The exemplary embodiment classifies or screens tables based on whether they are likely to include desired relational information before attempting detailed extraction processes. To identify tables that contain desired relations, we employed LIBSVM (Chang & Lin 2001), a well-known implementation of support vector machine. Based on the annotated tables, a separate model is trained for each desired relation. In the SEC domain, a table might contain multiple relations.

Exemplary features for use in the SVM include:
top 1000 words inside tables in the corpus, and top 200 words in text preceding the tables. These thresholds are based on experiments using LIBSVM 5-fold cross validation. A stop word list was used.
number of words in tables that are label words
number of cells containing single word
number of cells containing numbers
maximum cell string size
number of names
number of label words in the first row The exemplary embodiment then uses a model for each desired relation. Because "name+year+salary" and "name+year+bonus" cooccur 100% of the time in the annotated corpus, the same classifier was for both relations. In this domain, the number of negative instances is significantly larger than positive instances, perhaps because having both signature tables and tables containing background information in sentences format create significant overlap between positive and negative instances. To address this, the exemplary embodiment only uses a subset of negative instances for training (75% of our training instance are negative instances). We also trained a separate module to distinguish between a genuine and non-genuine tables based on annotated data. This second model is relation independent. The feature set is similar to the feature set outlined above.

To identify which words are likely to be names, we downloaded the list of names from (U.S. Census Bureau). The list of names is further filtered by removing the common words, such as "white", "cook", or "president", based on a English word list (Atkinson August 2004). Although it is feasible to use a list of common title words, the exemplary embodiment does not use such information so that it may operate more readily across other domains. However, in embodiment that do use such a domain-specific list, this information would probably significantly improve the precision and recall for extracting relation "name+title".

Label row and column classification: Based on the annotated data, LIBSVM is again used to classify which rows belong to boxhead and which columns belong to stub. The training data for the models are words in the desired tables that were manually identified as box-head and stubs by using lastLabelRow and lastLabelColumn features. Other features used include the frequency of label words, the frequency of name words, and frequency of numbers.

For each relation, the exemplary embodiment uses a different label column classifier, since the lastColumnLabel might differ between different relations, as explained in the Annotation Section.

Table structure recognition: Because tables in the SEC filings are somewhat complex and formatted for visual purpose, a significant amount of effort is needed to normalize the table to facilitate later operations. Once label rows and columns are identified, several normalization operations are carried out:
1. create duplicate cells based on rowspan and columnspan
2. merge cells into coherent label cells
3. identify subheadings
4. split specific column based on conjoin marker, such as "and" or parenthesis (before last label column)
5. split cells containing multiple labels, such as years "2005, 2006, 2007"

Step 1 specifically addresses the issue with the use of columnspan and rowspan in HTML table, as have been done in (Chen, Tsai, & Tsai 2000). In Table 3, without copying the original labels into spanning cells, the label "annual compensation" would not be attached to the value "1,300,000" using just the HTML specification. By doing this step, we only need to associate all the labels in the box-head in that particular column to the value and ignore other columns.

In Step 2, we use certain layout information, such as underline, empty line, or background color, to determine when a label is really complete. In SEC filings, there are many instances where a label is broken up into multiple cells in the boxhead or stub. In those cases, we want to recreate the semantically meaningful labels to facilitate later relation extraction—a process that is heavily dependent on the quality of the labels attached to the values. For example, in Table 3, based on the separate in row 5, cells "John T. Chambers", "President, Chief Executive", and "Officer and Director" are merged into one cell, with line break marker (#) inserted into the original position. The new cell is "John T. Chambers#President, Chief Executive#Officer and Director", and it is stored in cell on row 2, and copied to cells on row 3 and 4.

In Step 4, heuristic rules were applied to identify subheader. For example, if there is no value in the whole row except for the first label cell, then that label cell is classified as subheader. The subheader label is assigned as part of the label to every cell below it until a new subheader label cell is encountered.

Step 5 splits certain columns into multiple columns to ensure that a value cell does not contain multiple values. For example, in Table 3, the first cell in first column is "name and principal position". The system detects the word "and" and split the column into two columns, "name" and "principal position", and do similar operations to all the cells in the original column. Remember in Step 3, cell on row 2 is the result of merge 3 cells, with line break markers between the string in the original cells. By default, we use the first line break marker to break the merged cell into two cells. After this transformation, we have "John T. Chambers" and "President, Chief . . . " that corresponding to "name" and "principal position". This type of operation is not only limited to "and", but also to certain parenthesis, "Nondirector Executive Officer (Age as of Feb. 28, 2006)". Such cells are broken into two, and so are the other cells in the same column.

Step 6 deals with repeated sequences in last label column. In Table 3, we are fortunate that all the cells under "fiscal year" contains only 1 value. There are instances in our corpus that such information is represented inside the same cell with line break between each value. In such cases, there are no lines between these values, and the resulting table looks cleaner and thus visually more pleasing. It is certainly incorrect to assign all 3 years "2005, 2004, 2003" to the cell containing bonus information "1,300,000". To address this, our system performs repeated sequence detection on all last label columns. If a sequence pattern, which doesn't always have to be exactly the same, is detected, the repeated sequence are broken into multiple cells so that each cell can be assigned to the associated value correctly.

Transforming a normalized table to Wang's representation (Wang 1996) is a trivial process. Given a value cell at (r,c), all the label cells in column (c) and row (r) are its associated labels. In addition, the labels in stub might also have additional associated labels in the boxhead, and those should be associated with the value cell also. For example, the value "1,300,000" will have following 4 associated labels: [annual compensation|bonus($)(1)], [fiscal year|2005], [principal position|president, chief executive officer and director], [name|John T. Chambers]. The characters "|" inside those associate labels indicate hierarchical relation between the labels. For tables with subheading, the subheading labels have already been inserted into all the associated labels in the stubs earlier.

Table understanding: Similar to (Gatterbauer et al. 2007), we consider IE from Wang's model requires further intelligent processing. To populate database based on Wang's representation, a rule-based system is used. We specifically look for certain patterns, such as "name", "title" or "position" in the associated labels in order to populate the "name-title" relation. For different relations, a different set of patterns is used. It's important to perform error analysis at this stage to detect ineffective patterns. For example, several tables with "name-title" information used the phrase "nondirector executive officer" instead of the label for "name". Clearly, we can apply supervised machine learning to make the process more robust. In our annotation, we have asked the annotators to identify the columns that contains the information we want in valueColumn. Such information might be used to train our table understanding module in the future.

The following procedures can be used to tailor our approach to a new application or domain:

Collect a corpus and annotate the tables with the desired information as described in the Annotation section.

Modify features to take advantage of knowledge in the new domain.

Train all the classifiers. Depending on the size of the corpus, different thresholds can be specified to minimize the size of the vocabulary, which is used as features. This training process can be automated.

Modify table normalization to take advantage of domain knowledge. For example, in SEC domain, separating the label cell "name and title" is applied in order to simply later relation extraction operations.

Modify relation extraction rules. Different relations are signaled by different words in the labels. Currently, we manually specify these rules.

This process is designed to maximize precision and recall while minimizing the annotation effort. Each component can be modified to take advantage of the domain specific information to improve its performance.

Exemplary Generation of Sentence Paraphrases

An additional embodiment of the present invention includes a tool that generates sentence paraphrases starting from the seed templates provided by a user. The tool takes sentences that indicate an event with high precision with the actual entities replaced by their generic types, for example:

<ORG> bought <ORG>
<ORG>'s merger with <ORG>

The sentence is searched for in a corpus and actual entity identities are obtained from sentences conforming to the seed pattern. Then other sentences mentioning the same entities in the corpus are located and these serve as which serves as paraphrases for the initial sentence. (In some embodiments, the other sentences are restricted to those occurring within a narrow time window). Each one of these other sentences can then be treated as a seed template or pattern by removing the named entities and then repeating the search for other sentences that conform to this new seed pattern. The sentences can be ordered according to frequencies of component phrases and manually checked to generate gold data for the classifiers.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the issued claims and their equivalents.

What is claimed is:

1. A computer-implemented method of identifying and extracting by a computer financial information from tables in documents, the method comprising:

automatically, without further intervention from a user, identifying by a computer a document from a set of documents retrieved by the computer from a document source database;

screening the identified document by a support vector machine classifier to distinguish between tables and non-tables and identify one or more tables that contain a desired relation without performing a detailed extraction process;

identifying within the identified document a table from a set of tables that contains at least one predetermined desired relation, wherein the at least one predetermined desired relation comprises a plurality of desired attributes and desired values;

partitioning by the computer the identified table into a plurality of labels and one or more values, with one or more of the labels identified as a column label and one or more identified as a row label;

determining by the computer a set of attribute-value pairs by associating each value of the one or more values partitioned from the identified table with a plurality of the labels, with an abstract table including the set of attribute-value pairs; and generating by the computer a set of data for inclusion into a database of financial information, the set of data generated for inclusion in the database of financial information based on the determined set of attribute-value pairs.

2. The method of claim 1, wherein identifying in the document a table that contains at least one predetermined desired relationship includes using a support vector machine.

3. The method of claim 1, wherein the document is a Securities and Exchange Commission filing.

4. A computer-based information extraction system having at least one processor and at least one non-transitory memory for storing code, the system comprising:

a document identifier set of code, stored in the memory, when executed by the processor adapted to automatically, without further intervention from a user, identify a document from a set of documents, the set of documents retrieved by the system from a document source database;

a document screening set of code, stored in the memory, when executed by the processor adapted to screen the identified document by a support vector machine classifier to distinguish between tables and non-tables and identify one or more tables in the identified document that contain information of interest without performing a detailed extraction process;

a table identifier set of code, stored in the memory, when executed by the processor adapted to automatically, without further intervention from a user, identify within the identified document a table from a set of tables that contains the information of interest, wherein the information of interest comprises a plurality of desired attributes and desired values;

a normalization set of code, stored in the memory, when executed by the processor adapted to normalize information contained in the identified table by partitioning the identified table into a plurality of labels and one or more values, with one or more of the labels identified as a column label and one or more identified as a row label;

a value association set of code, stored in a memory, when executed by the processor adapted to determine a set of attribute-value pairs by associating each value of the one more values partitioned from the identified table with a plurality of the labels resulting in the set of attribute-value pairs; and a database set of code, stored in a memory, when executed by the processor adapted to generate a set of data for inclusion into a database of financial information, the set of data generated for inclusion into the database of financial information based at least in part on the determined set of attribute-value pairs.

5. The system of claim 4, wherein the database set of code comprises a rule-based inference module when executed by the processor is adapted to populate the database of financial information based on the set of attribute-value pairs.

6. The system of claim 4, wherein the table identifier set of code when executed by the processor is adapted to identify within a document a table by using relation-specific classifiers.

7. The method of claim 4, wherein one or both of the table identifier set of code and the normalization set of code involve using supervised machine learning.

8. The system of claim 7, wherein one or both of the table identifier set of code and the normalization set of code involve using annotation in performing the supervised machine learning.

9. The system of claim 4, wherein the value association set of code when executed by the processor is further adapted to define a set of relations derived at least in part from the set of attribute-value pairs.

10. The system of claim 9, wherein the set of relations includes a combination of two or more of the following: name; age; title; salary; bonus; fiscal year; options; compensation.

11. The system of claim 4, wherein the table identifier set of code when executed by the processor is adapted to identify within a document a table that contains information of interest based on determining the presence of a set of desired relations.

12. The system of claim 11, wherein the table identifier set of code is based on using a support vector machine to train a set of at least one model for each of the set of desired relations.

13. The system of claim 4, wherein the labels conform to a set of semantic rules with respect to a desired set of relations.

14. A computer-based method for extracting information, the method comprising:
automatically, without further intervention from a user, identifying by a computer a document from a set of documents retrieved by the computer from a document source database;
screening the identified document by a support vector machine classifier to distinguish between tables and non-tables and identify one or more tables that contain information of interest without performing a detailed extraction process;
identifying within the identified document a table from a set of tables that contains the information of interest, wherein the information of interest comprises a plurality of desired attributes and desired values;
normalizing by the computer information contained in the identified table by partitioning by a computer the identified table into a plurality of labels and one or more values, with one or more of the labels identified as a column label and one or more identified as a row label;
determining by the computer a set of attribute-pairs by associating each value of the one more values partitioned from the identified table with a plurality of the labels resulting in the set of attribute-value pairs; and
generating by the computer a set of data for inclusion into a database of financial information, the set of data generated for inclusion into the database of financial information based at least in part on the determined set of attribute-value pairs.

15. The method of claim 14, wherein populating a database involves a rule-based process.

16. The method of claim 14, wherein identifying a table of interest involves using relation-specific classifiers.

17. The method of claim 14, wherein one or both of identifying a table of interest and normalizing information involve using supervised machine learning.

18. The method of claim 17, wherein one or both of identifying a table of interest and normalizing information involve using annotation in performing the supervised machine learning.

19. The method of claim 14, further comprising defining a set of relations derived at least in part from the set of attribute-value pairs.

20. The method of claim 19, wherein the set of relations includes a combination of two or more of the following: name; age; title; salary; bonus; fiscal year; options; compensation.

21. The method of claim 14, wherein identifying a table of interest is based at least in part on determining the presence of a set of desired relations.

22. The method of claim 21, wherein identifying a table of interest is based at least in part on using a support vector machine to train a set of at least one model for each of the set of desired relations.

23. The method of claim 14, wherein the labels conform to a set of semantic rules with respect to a desired set of relations.

24. The method of claim 14, further comprising:
automatically identifying and tagging a text segment in the document, the text segment comprising one or more of entity names, monetary expressions, and temporal expressions;
automatically tagging the entity names, monetary expressions, and temporal expressions within the text segment in the document;
identifying a financial event described within the automatically tagged text segment; and
defining in memory a data record associated with the financial event, the data record including data derived from the tagged text segment.

25. The method of claim 24, further comprising displaying on a display device at least a portion of the data record in association with a user selectable command feature of a graphical user interface for causing retrieval of a document including the text segment.

26. The method of claim 24, wherein the text segment is a grammatically complete sentence.

27. The method of claim 24, wherein the data record includes:
a company field including text identifying a named entity tagged in the text segment;
a company ID field including a alphanumeric code identifying the named entity; and
a time period field including an alphanumeric code identifying a financial reporting period.

28. The method of claim 24, wherein the data record includes a field indicating whether a monetary expression tagged in the text segment is trending up or down based on a comparison to a previous value.

29. The method of claim 24, further comprising:
automatically tagging entity names within a text segment as being one of a person, company, and location; and
automatically associating one or more of the tagged entity names with an entry in a data set of named entities.

* * * * *